US008031210B2

(12) United States Patent
Elsberg et al.

(10) Patent No.: US 8,031,210 B2
(45) Date of Patent: Oct. 4, 2011

(54) METHOD AND APPARATUS FOR CREATING A COMPOSITE IMAGE

(75) Inventors: Nathan Elsberg, Modiin (IL); Alex Hazanov, Katzir (IL)

(73) Assignee: RDV Systems Ltd., Rosh Haayin (IL)

( * ) Notice: Subject to any disclaimer, the term of this patent is extended or adjusted under 35 U.S.C. 154(b) by 871 days.

(21) Appl. No.: 11/865,003

(22) Filed: Sep. 30, 2007

(65) Prior Publication Data

US 2009/0085910 A1   Apr. 2, 2009

(51) Int. Cl.
*G09G 5/22* (2006.01)
(52) U.S. Cl. ............................................ 345/632
(58) Field of Classification Search .................... 345/632
See application file for complete search history.

(56) References Cited

U.S. PATENT DOCUMENTS

| | | | | |
|---|---|---|---|---|
| 5,736,977 | A * | 4/1998 | Hughes | 715/716 |
| 5,832,106 | A * | 11/1998 | Kim | 382/154 |
| 5,905,657 | A | 5/1999 | Celniker | |
| 6,084,979 | A * | 7/2000 | Kanade et al. | 382/154 |
| 6,128,577 | A | 10/2000 | Assa et al. | |
| 6,313,837 | B1 | 11/2001 | Assa et al. | |
| 6,434,255 | B1 * | 8/2002 | Harakawa | 382/103 |
| 6,437,823 | B1 * | 8/2002 | Zhang | 348/187 |
| 6,476,803 | B1 * | 11/2002 | Zhang et al. | 345/419 |
| 6,816,187 | B1 * | 11/2004 | Iwai et al. | 348/187 |
| 6,910,001 | B2 | 6/2005 | Hammersley et al. | |
| 6,930,715 | B1 * | 8/2005 | Mower | 348/239 |
| 7,080,096 | B1 * | 7/2006 | Imamura | 1/1 |
| 7,692,649 | B2 * | 4/2010 | Elsberg et al. | 345/423 |
| 2002/0144278 | A1 | 3/2002 | Pratts et al. | |
| 2002/0107674 | A1 * | 8/2002 | Bascle et al. | 703/1 |
| 2003/0086603 | A1 * | 5/2003 | Davidson et al. | 382/154 |
| 2003/0091227 | A1 * | 5/2003 | Chang et al. | 382/154 |
| 2005/0091016 | A1 | 4/2005 | Godavarthy et al. | |
| 2005/0273354 | A1 * | 12/2005 | Adams | 705/1 |
| 2006/0232583 | A1 * | 10/2006 | Petrov et al. | 345/419 |
| 2007/0078636 | A1 | 4/2007 | Elsberg et al. | |
| 2007/0279494 | A1 * | 12/2007 | Aman et al. | 348/169 |
| 2008/0012863 | A1 | 1/2008 | Finn et al. | |
| 2008/0027684 | A1 * | 1/2008 | Inzinga et al. | 703/1 |

(Continued)

OTHER PUBLICATIONS

Extended Abstracts Magic Home: Exploiting the Duality between the Physical and the Virtual Worlds Dadong Wan Center for Strategic Technology Research Andersen Consulting, in the 2000 Conference on Human Factors in Computer Systems (CHI 2000), 2 pages.*

(Continued)

*Primary Examiner* — Javid Amini
(74) *Attorney, Agent, or Firm* — Simon Kahn

(57) ABSTRACT

A method of rendering a computer generated 3D scene integrated with a base image, the method comprising loading a base image, such as a photograph, and a computer generated 3D scene or model. The base image is displayed on a monitor, and in one embodiment the calibration of the camera which generated the base image is determined. The 3D model is rendered as an overlay of the base image responsive thereto. In another embodiment, the camera calibration of the 3D scene is made consonant with the base image by selecting corresponding points. The base image is then additionally displayed at a predetermined transparency as an overlay of the 3D model. A user then selects pixels of the base image overlay for placement in the foreground. The selected pixels are then displayed without transparency and the balance of the base image overlay removed rendering the integrated image.

13 Claims, 3 Drawing Sheets

U.S. PATENT DOCUMENTS

2008/0229234 A1 9/2008 Astolfi et al.
2009/0315978 A1* 12/2009 Wurmlin et al. ............... 348/43

OTHER PUBLICATIONS

A versatile camera calibration technique for high-accuracy 3D machine vision metrology using off-the-shelf TV cameras and lenses Tsai, R.; Robotics and Automation, IEEE Journal of vol. 3, Issue: 4, 1987.*

Tsai, Roger Y; A Versatile Camera Calibration Technique for High-Accuracy 3D Machine Vision Metrology Using off the Shelf TV Cameras and Lenses, IEEE Journal of Robotics and Automation, vol. 3, No. 4, pp. 323-344, 1987 New York.

Horn, Berthold K.P.; Tsai's Camera Calibration Method Revisited, Published On Line by MIT Computer Science and Artificial Intelligence Laboratory, Jan. 1, 2004.

* cited by examiner

METHOD AND APPARATUS FOR CREATING A COMPOSITE IMAGE

BACKGROUND OF THE INVENTION

The invention relates generally to the field of computer graphics, and in particular to a system and method of integrating a base image, such as a photograph, and a computer generated 3D scene.

The use of interactive and dynamic 3D computer graphics is becoming prevalent in the computing world. Typically, 3D visualization applications provide photo-realistic results using techniques such as ray tracing, radiosity, global illumination and other shading, shadowing and light reflection techniques. Such 3D visualization applications provide a 3D generated model, without relationship to the existing environment.

U.S. patent application Ser. No. 11/538,103 to Elsberg et al, entitled "Method and Apparatus for Virtual Reality Presentation of Civil Engineering, Land Planning and Infrastructure", published as US 2007/0078636 A1, the entire contents of which are incorporated herein by reference, is addressed to a computer implemented method of visualizing an infrastructure. Such a method allows for evaluating large scale designs in a virtual reality environment.

In the real world, designs such as civil engineering or architectural projects are developed within an existing landscape, which will be impacted by the project. In order to properly visualize the appearance and impact of these designs, preferably any 3D generated model should allow for integration within the existing landscape. Unfortunately, existing modeling programs are not designed to integrate with existing landscape imaging.

An article by Roger Y. Tsai entitled "A Versatile Camera Calibration Technique for High-Accuracy 3D Machine Vision Metrology Using off-the Shelf TV Cameras and Lenses", published by the Institute of Electrical and Electronics Engineers (IEEE), New York, in the IEEE Journal of Robotics and Automation, Vol. 3, NO. 4, pp. 323-344, 1987, the entire contents of which are incorporated herein by reference, teaches a method for camera calibration, i.e. the recovery of the principle distance and the principle point in the image plane. Tsai's method for camera calibration is cited as recovering the interior orientation, the exterior orientation, the power series coefficients for distortion, and an image scale factor that best fits the measured image coordinates corresponding to known target point coordinates. Thus, from an image or photograph in which the precise location of a number of points is known, the position, orientation and optical information of the camera can be determined.

There is thus a long felt need for an integrated system for rendering a computer generated 3D scene integrated with a base image.

SUMMARY OF THE INVENTION

Accordingly, it is a principal object of the present invention to overcome the disadvantages of prior art systems of rendering a computer generated 3D scene integrated with a base image. This is accomplished in the present invention by a method comprising loading a base image, such as a photograph, and a computer generated 3D scene or model. The base image is displayed on a monitor, and in one embodiment the position, orientation and optical information of the camera which generated the base image is determined. The 3D scene is rendered as an overlay of the base image responsive to the determined position, orientation and optical information of the camera. In another embodiment, the camera calibration of the 3D scene is made consonant with the base image by selecting corresponding points. Optionally, a user is enabled to perform fine tuning of the camera position, orientation and optical setting for the 3D model to improve the photo-realistic results.

The base image is then additionally displayed at a predetermined transparency, such as at 50%, as an overlay of the 3D model. A user then selects pixels, areas, images, color groups, or a combination thereof, of the base image overlay for placement in the foreground. The selected pixels, areas, images, color groups, or a combination thereof, of the base image overlay is then displayed without transparency and the balance of the base image overlay removed, optionally by setting to 100% transparency, rendering the integrated image.

In one embodiment the 3D model exhibits elements with a matte texture. The elements with the matte texture exhibit the texture of the base image when overlaid. Advantageously, the elements with a matte texture may exhibit shadows from other elements in the 3D model.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawing.

DETAILED DESCRIPTION OF THE PREFERRED EMBODIMENTS

Figure 1:
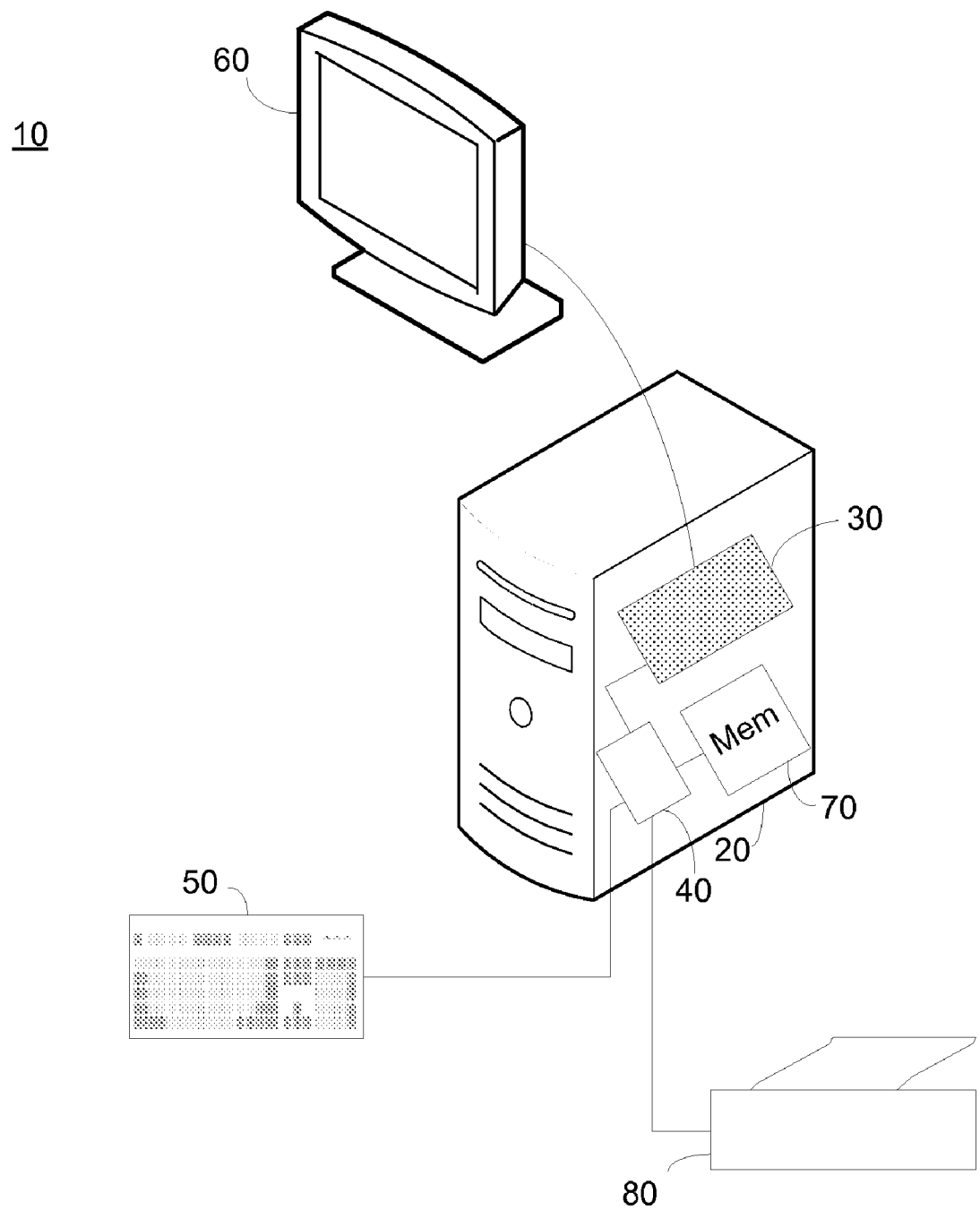
FIG. 1 illustrates a high level block diagram of a computing platform in accordance with a principle of the current invention.

The present embodiments enable a method of rendering a computer generated 3D scene integrated with a base image, the method comprising loading a base image, such as a photograph, and a computer generated 3D scene or model. The base image is displayed on a monitor, and in one embodiment the position, orientation and optical information of the camera which generated the base image is determined. The 3D model is rendered as an overlay of the base image responsive thereto. In another embodiment, the camera calibration of the 3D scene is made consonant with the base image by selecting corresponding points.

The base image is then additionally displayed at a predetermined transparency as an overlay of the 3D model. A user then selects pixels of the base image overlay for placement in the foreground. The selected pixels are then displayed without transparency and the balance of the base image overlay removed rendering the integrated image.

In one embodiment the 3D model exhibits elements with a matte texture. The elements with the matte texture exhibit the texture of the base image when overlaid.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level block diagram of a computing platform 10 in accordance with a principle of the current invention comprising: a computing device 20 comprising a graphics card 30, a processor 40 and a memory 70; a user input device 50; a monitor 60; and an output device 80, such as a printer. Monitor 60 is connected to the output of graphics card 30 and computing device 20 is connected to user input device 50. Processor 40 is in communication with graphics card 30, memory 70, user input 50 and output device 80.

User input device 50 is illustrated as a keyboard, however this is not meant to be limiting in any way. The use of any or all of a pointing device, a voice input, or a touch screen is equally applicable and is specifically included. Memory 70 is illustrated as being internal to computing device 20, however this is not meant to be limiting in any way. Memory 70 may be provided external to computing device 20, such as a network server, the Internet, or a removable computer readable media, without exceeding the scope of the invention. Memory 70 comprises a base image, such as a photograph of a landscape upon which a project is planned, and a 3D scene of the project. In one embodiment the 3D scene is developed in accordance with the teachings of U.S. patent application Ser. No. 11/538,103 to Elsberg et al, entitled "Method and Apparatus for Virtual Reality Presentation of Civil Engineering, Land Planning and Infrastructure", published as US 2007/0078636 A1, incorporated above by reference. Memory 70 of computing device 20 is further operative to store the method according to the principle of the invention in computer readable format for execution by computing device 20.

In operation, computing device 20 loads the base image from memory 70, and displays the base image on monitor 60 via graphics card 30. In one embodiment, a user then selects a plurality of known locations on the base image, preferably via user input device 50, such as a pointing device, particularly a mouse, and inputs the known coordinates for each of the known locations via user input device 50, such as a keyboard.

Processor 40, responsive to the selected known locations and their coordinates received via user input device 50, calculates the camera calibration for the base image. Processor 40 further loads the 3D scene of the project from memory 70, and renders the 3D scene responsive to the determined camera calibration overlaying the displayed base image. Preferably this is performed using OpenGL or DirectX protocols. OpenGL is a standard for graphics programming available from the OpenGL Architecture Review Board, care of the Kronos Group, Chillicothe, Ohio. DirectX is available from Microsoft Corporation, Redmond, Wash.

In another embodiment, a user selects one or more locations on the base image, preferably via user input device 50, such as a pointing device, particularly a mouse, and corresponding locations on the rendered 3D scene. Responsive to the identified corresponding locations, the 3D scene and base image are projected at a consonant camera calibration.

In yet another embodiment, a combination of at least one corresponding location and at least one user identified location with known coordinates are provided. Responsive to the identified corresponding location, or locations, and the user identified location, or locations, with coordinates, the 3D scene and base image are projected at a consonant camera calibration.

Thus, the 3D scene and the base image are approximately consonant in terms of viewing angle, sizing and positioning. Optionally, via user input 50, the camera calibration for the 3D scene is adjusted, or fine tuned, so as to improve the consonance thereby producing a photo-realistic result.

Optionally, some elements of the 3D scene are provided with a matte texture. The viewed texture of those elements is thus automatically supplied by the base image.

Processor 40 further displays the base image with a predetermined transparency as an overlay of the displayed 3D scene on monitor 60. Thus the base image appears as the background and in the foreground with a predetermined transparency, such as about 50%. The user identifies, via user input device 50, such a pointing device, particularly a mouse, pixels of the base image which are to appear in the foreground. It is to be understood that the user may select pixels individually, by areas, by images, by color groups, or any combination thereof.

Processor 40 displays the selected pixels without transparency and removes all unselected pixels, thereby rendering the integrated image. In one embodiment, the unselected pixels are set to 100% transparency. Optionally, processor 40 further prints, or otherwise outputs, the integrated image to output device 80.

Figure 2A:
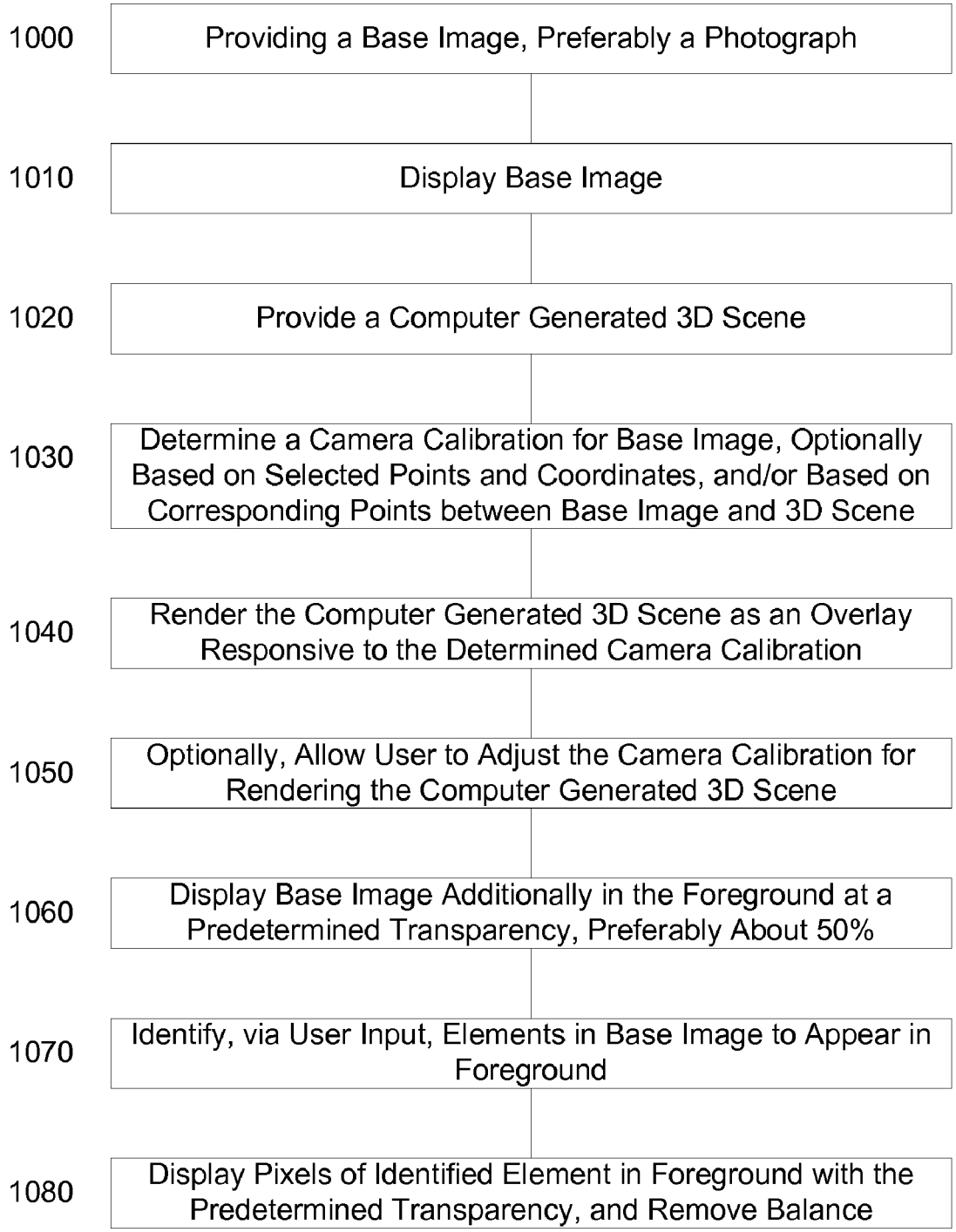
FIG. 2A illustrates a high level flow chart of a method of integrating a base image and a computer generated 3D scene in accordance with a principle of the current invention.

FIG. 2A illustrates a high level flow chart of a method of integrating a base image and a computer generated 3D scene in accordance with a principle of the current invention, operable in cooperation with computing platform 10 of FIG. 1. In stage 1000, a base image is provided. Preferably the base image is a photograph, such as a photograph of a landscape upon which a civil engineering or architectural project is planned.

In stage 1010, the base image is displayed on a monitor. In stage 1020, a computer generated 3D scene of a civil engineering or architectural project, or other 3D scene or image, is provided. In one embodiment, the 3D scene is loaded from memory 70. In another embodiment, the 3D scene is generated in accordance with the teachings of U.S. patent application Ser. No. 11/538,103 to Elsberg et al, entitled "Method and Apparatus for Virtual Reality Presentation of Civil Engineering, Land Planning and Infrastructure", published as US 2007/0078636 A1, incorporated above.

In stage 1030, the camera calibration for the base image is determined. In one embodiment this is accomplished in cooperation with a user selecting a plurality of known locations on the base image, and inputting the known coordinates for each of the known locations. In one further embodiment, camera calibration is accomplished in accordance with teaching of Roger Y. Tsai entitled "A Versatile Camera Calibration Technique for High-Accuracy 3D Machine Vision Metrology Using off-the Shelf TV Cameras and Lenses", published in the IEEE Journal of Robotics and Automation, Vol. 3, NO. 4, pp. 323-344, 1987, incorporated above; and/or "An Efficient and Accurate Camera Calibration Technique for 3D Machine Vision", published by the IEEE, New York, as Proceedings of IEEE Conference of Computer Vision and Pattern Recognition, Miami Beach, Fla. pp. 364-374, 1986, the entire contents of which are incorporated herein by reference. In another embodiment, a user selects one or more locations on the base image, and corresponding locations on the rendered 3D scene. Responsive to the identified corresponding locations, the 3D scene and base image are projected at a consonant camera calibration. Thus, the determined camera calibration need not be absolute, and may be determined in relation to the 3D scene.

In yet another embodiment, a combination of at least one corresponding location and at least one user identified location with known coordinates are provided. Responsive to the identified corresponding location, or locations, and the user identified location, or locations, with coordinates, the 3D scene and base image are projected at a consonant camera calibration.

In stage 1040, the computer generated 3D scene is rendered overlaying the base image of stage 1010 responsive to the determined camera calibration. Preferably, this is performed using OpenGL or DirectX protocols. Advantageously, by using the determined camera calibration, the 3D scene and the base image are approximately consonant in terms of viewing angle, sizing and positioning. In stage 1050, optionally, a user is allowed to adjust the camera calibration for the 3D scene so as to improve the consonance thereby producing a photo-realistic result.

In stage 1060, the base image is additionally displayed in the foreground with a predetermined transparency as an overlay of the displayed 3D scene of stage 1040. Thus the base image of stage 1010 appears as the background and in the foreground with a predetermined transparency, such as about 50%.

In stage 1070, the user identifies, via a pointing device, particularly a mouse, or other user input device, pixels of the base image which are to appear in the foreground of the integrated image. It is to be understood that the user may select pixels individually, by areas, by images, by color groups, or any combination thereof.

In stage 1080, the selected pixels of stage 1070 are displayed without transparency in the foreground of the integrated image and all unselected pixels are removed, thereby rendering the integrated image. In one embodiment, the unselected pixels are set to 100% transparency and thus are not seen. Optionally, the integrated image is printed, or otherwise output, onto output device 80.

Figure 2B:
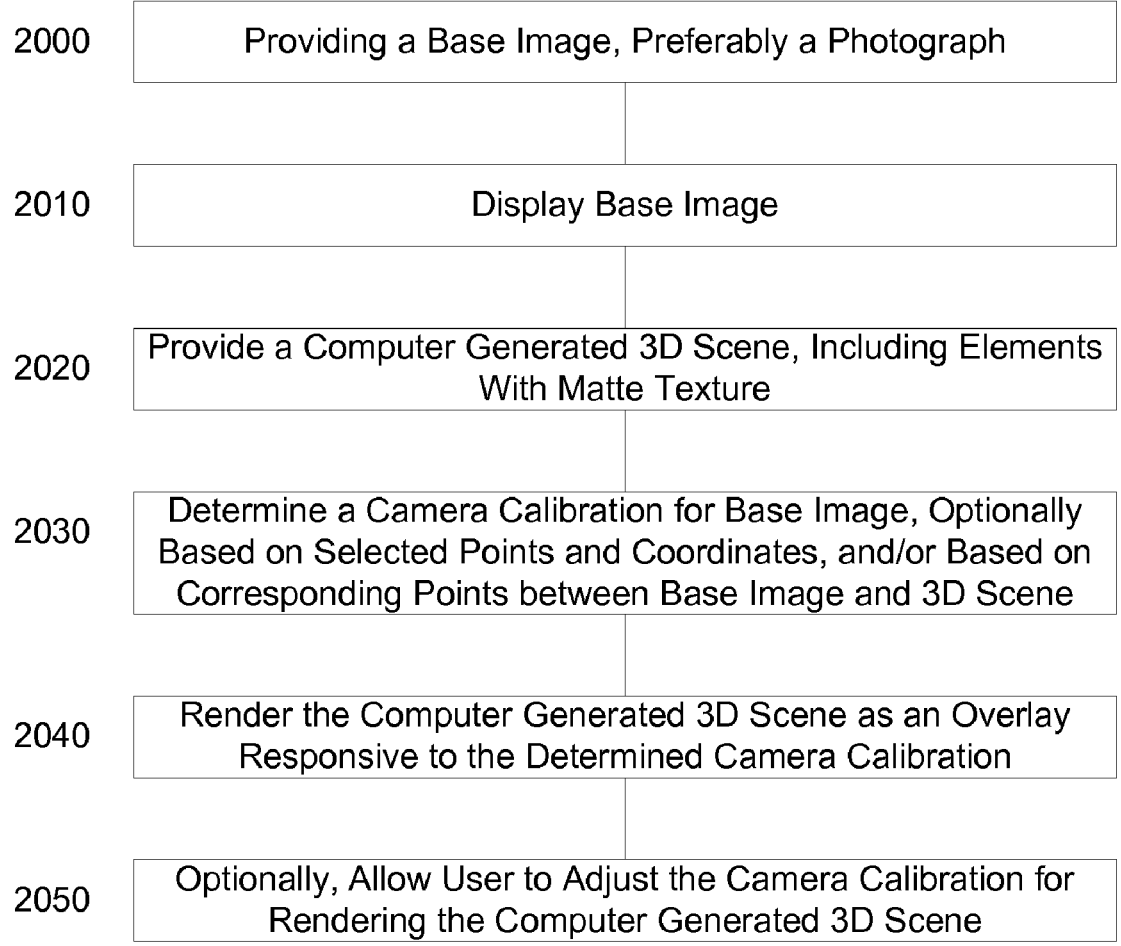
FIG. 2B illustrates a high level flow chart enabling the texture of certain elements of the computer generated 3D scene to be determined by the base image in accordance with a principle of the current invention.

FIG. 2B illustrates a high level flow chart enabling the texture of certain elements of the computer generated 3D scene to be determined by the base image in accordance with a principle of the current invention. Advantageously, the elements with a matte texture may exhibit shadows from other elements in the 3D model. In stage 2000, a base image is provided. Preferably the base image is a photograph, such as a photograph of a landscape upon which a civil engineering or architectural project is planned.

In stage 2010 the base image is displayed on a monitor. In stage 2020, a computer generated 3D scene of a civil engineering or architectural project, or other 3D scene or image, is provided. In one embodiment the 3D scene is loaded from memory 70. In another embodiment, the 3D scene is generated in accordance with the teachings of U.S. patent application Ser. No. 11/538,103 to Elsberg et al, entitled "Method and Apparatus for Virtual Reality Presentation of Civil Engineering, Land Planning and Infrastructure", published as US 2007/0078636 A1, incorporated above. The 3D scene is prepared with at least one element exhibiting a matte texture. The term matte texture as used herein means that the actual displayed texture of the element is viewed from the underlying image, if any. Thus, at least one element of the 3D scene, if displayed directly, would appear without texture.

In stage 2030, the camera calibration for the base image is determined. In one embodiment, this is accomplished in cooperation with a user selecting a plurality of known locations on the base image, and inputting the known coordinates for each of the known locations. In one further embodiment, camera calibration is accomplished in accordance with teaching of Roger Y. Tsai entitled "A Versatile Camera Calibration Technique for High-Accuracy 3D Machine Vision Metrology Using off-the Shelf TV Cameras and Lenses", published in the IEEE Journal of Robotics and Automation, Vol. 3, NO. 4, pp. 323-344, 1987, incorporated above; and/or "An Efficient and Accurate Camera Calibration Technique for 3D Machine Vision", published by the IEEE, New York, as Proceedings of IEEE Conference of Computer Vision and Pattern Recognition, Miami Beach, Fla. pp. 364-374, 1986, the entire contents of which are incorporated herein by reference. In another embodiment, a user selects one or more locations on the base image and corresponding locations on the rendered 3D scene. Responsive to the identified corresponding locations, the 3D scene and base image are projected at a consonant camera calibration. Thus, the determined camera calibration need not be absolute, and may be determined in relation to the 3D scene.

In yet another embodiment a combination of at least one corresponding location and at least one user identified location with known coordinates are provided. Responsive to the identified corresponding location, or locations, and the user identified location, or locations, with coordinates, the 3D scene and base image are projected at a consonant camera calibration.

In stage 2040, the computer generated 3D scene is rendered overlaying the base image of stage 2030 responsive to the determined camera calibration overlaying the displayed base image. Preferably this is performed using OpenGL or DirectX protocols. Advantageously, by using the determined camera calibration, the 3D scene and the base image are approximately consonant in terms of viewing angle, sizing and positioning. In stage 2050, optionally, a user is allowed to adjust the camera calibration for the 3D scene so as to improve the consonance thereby producing a photo-realistic result. As a result of the consonance and the overlay, the elements of stage 2030 exhibiting a matte texture appear with the texture of the base image without requiring further modification.

Thus the present embodiments enable a method of rendering a computer generated 3D scene integrated with a base image, the method comprising loading a base image, such as a photograph, and a computer generated 3D scene or model. The base image is displayed on a monitor, and in one embodiment the position, orientation and optical information of the camera which generated the base image is determined. The 3D model is rendered as an overlay of the base image responsive thereto. In another embodiment, the camera calibration of the 3D scene is made consonant with the base image by selecting corresponding points.

The base image is then additionally displayed at a predetermined transparency as an overlay of the 3D model. A user then selects pixels of the base image overlay for placement in the foreground. The selected pixels are then displayed without transparency and the balance of the base image overlay removed rendering the integrated image.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

We claim:

1. A computing platform arranged to render an integrated two dimensional image constituted of a computer generated three dimensional scene and a two dimensional base image the computing platform comprising a computing device, a memory, a monitor, and a user input device, the computer being arranged to:
    provide the two dimensional base image;
    display said two dimensional base image on said monitor;
    provide the computer generated three dimensional scene;
    determine the camera calibration of said displayed two dimensional base image;
    render said provided computer generated three dimensional scene on said monitor responsive to said determined camera calibration of said displayed two dimensional base image as an overlay over said displayed two dimensional base image;
    additionally display the two dimensional base image in the foreground of said rendered three dimensional scene at a predetermined transparency;
    identify elements, via said user input device, from said additionally displayed two dimensional base image to appear in the foreground of the integrated image, wherein said identified elements are a subset of the total displayed elements of said additionally displayed two dimensional base image;
    display said identified elements of said additionally displayed two dimensional base image without transparency on said monitor; and
    remove all unidentified elements of said additionally displayed two dimensional base image thereby rendering said integrated two dimensional image on said monitor as a combination of said displayed two dimensional base image overlaid by said rendered three dimensional scene with said identified elements of said additionally displayed two dimensional base image displayed without transparency in the foreground.

2. A computing platform according to claim 1, wherein said determination of the camera calibration of said displayed two dimensional base image is responsive to at least one user selected point on said displayed two dimensional base image and a user input coordinate of said at least one selected point.

3. A computing platform according to claim 1, wherein said determination of the camera calibration of said displayed two dimensional base image is responsive to at least one user selected point on said displayed two dimensional base image and a corresponding respective at least one point on said rendered computer generated three dimensional scene.

4. A computing platform according to claim 1, wherein said computing device is further arranged, after said rendering of said provided computer generated three dimensional scene on said monitor responsive to said determined camera calibration as an overlay over said displayed two dimensional base image, to:
    adjust, responsive to a user input, said determined camera calibration for rendering said provided computer generated three dimensional scene.

5. A computing platform according to claim 1, wherein said removing all unidentified elements of said additionally displayed two dimensional base image comprises:
    display said unidentified elements at 100% transparency.

6. A computing platform according to claim 1, wherein said provided computer generated three dimensional scene comprises at least one element exhibiting matte texture.

7. A computing platform according to claim 1, wherein said provided two dimensional base image is a photograph.

8. A computer-readable medium containing instructions for controlling a computing device to perform a method of rendering an integrated two dimensional image constituted of a computer generated three dimensional scene and a two dimensional base image, the method comprising:
    providing the two dimensional base image;
    displaying said two dimensional base image;
    providing the computer generated three dimensional scene;
    determining the camera calibration of said displayed two dimensional base image;
    rendering said provided computer generated three dimensional scene responsive to said determined camera calibration of said displayed two dimensional base image as an overlay over said displayed two dimensional base image;
    displaying said two dimensional base image additionally in the foreground of said rendered three dimensional scene at a predetermined transparency;
    identifying elements from said additionally displayed two dimensional base image to appear in the foreground of the integrated two dimensional image, wherein said identified elements are a subset of the total displayed elements of said additionally displayed two dimensional base image;
    displaying said identified elements of said additionally displayed two dimensional base image without transparency; and
    removing all unidentified elements of said additionally displayed two dimensional base image thereby rendering said integrated two dimensional image as a combination of said displayed two dimensional base image overlaid by said rendered three dimensional scene with said identified elements of said additionally displayed two dimensional base image displayed without transparency in the foreground.

9. A computer-readable medium according to claim 8, wherein said determining the camera calibration of said displayed two dimensional base image is responsive to at least one user selected point on said displayed two dimensional base image and a user input coordinate of said at least one selected point.

10. A computer-readable medium according to claim 8, wherein said determining the camera calibration of said displayed two dimensional base image is responsive to at least one user selected point on said displayed two dimensional base image and a corresponding respective at least one point on said rendered computer generated three dimensional scene.

11. A computer-readable medium according to claim 8, wherein the method further comprises after said rendering said provided computer generated three dimensional scene as an overlay:

adjusting, responsive to a user input, said camera calibration for rendering said provided computer generated three dimensional scene.

12. A computer-readable medium according to claim 8, wherein said removing all unidentified elements of said additionally displayed two dimensional base image comprises displaying said unidentified elements at 100% transparency.

13. A computer-readable medium according to claim 8, wherein said provided computer generated three dimensional scene comprises at least one element exhibiting matte texture.

* * * * *